April 21, 1964
F. J. DITTER
3,129,770
POWERED TURF EDGING MACHINE
Filed Nov. 29, 1961
2 Sheets-Sheet 1
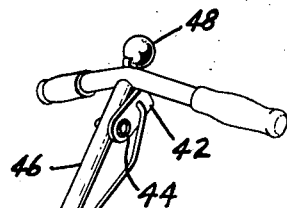
Fig-1-
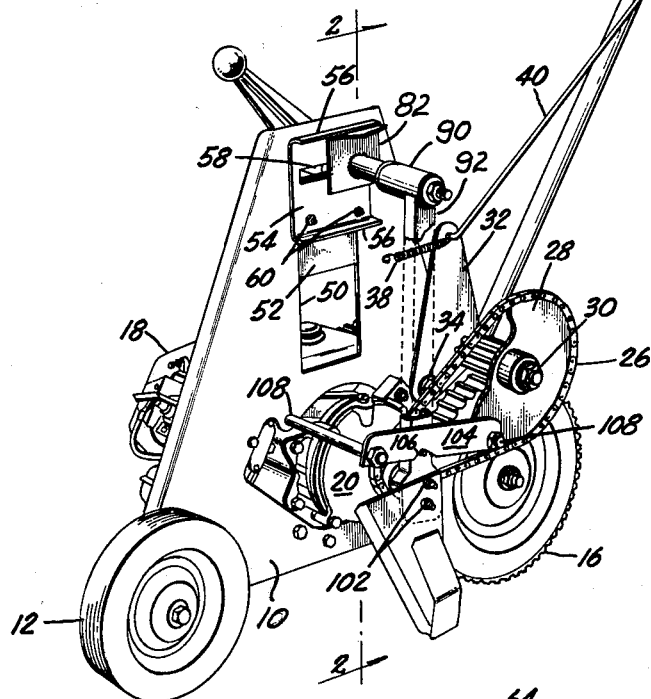
Fig-4-
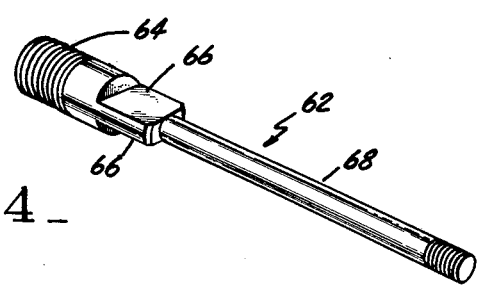
INVENTOR.
FRANCIS J. DITTER
BY
Stuart R. Peterson
ATTORNEY April 21, 1964
F. J. DITTER
3,129,770
POWERED TURF EDGING MACHINE
Filed Nov. 29, 1961
2 Sheets-Sheet 2
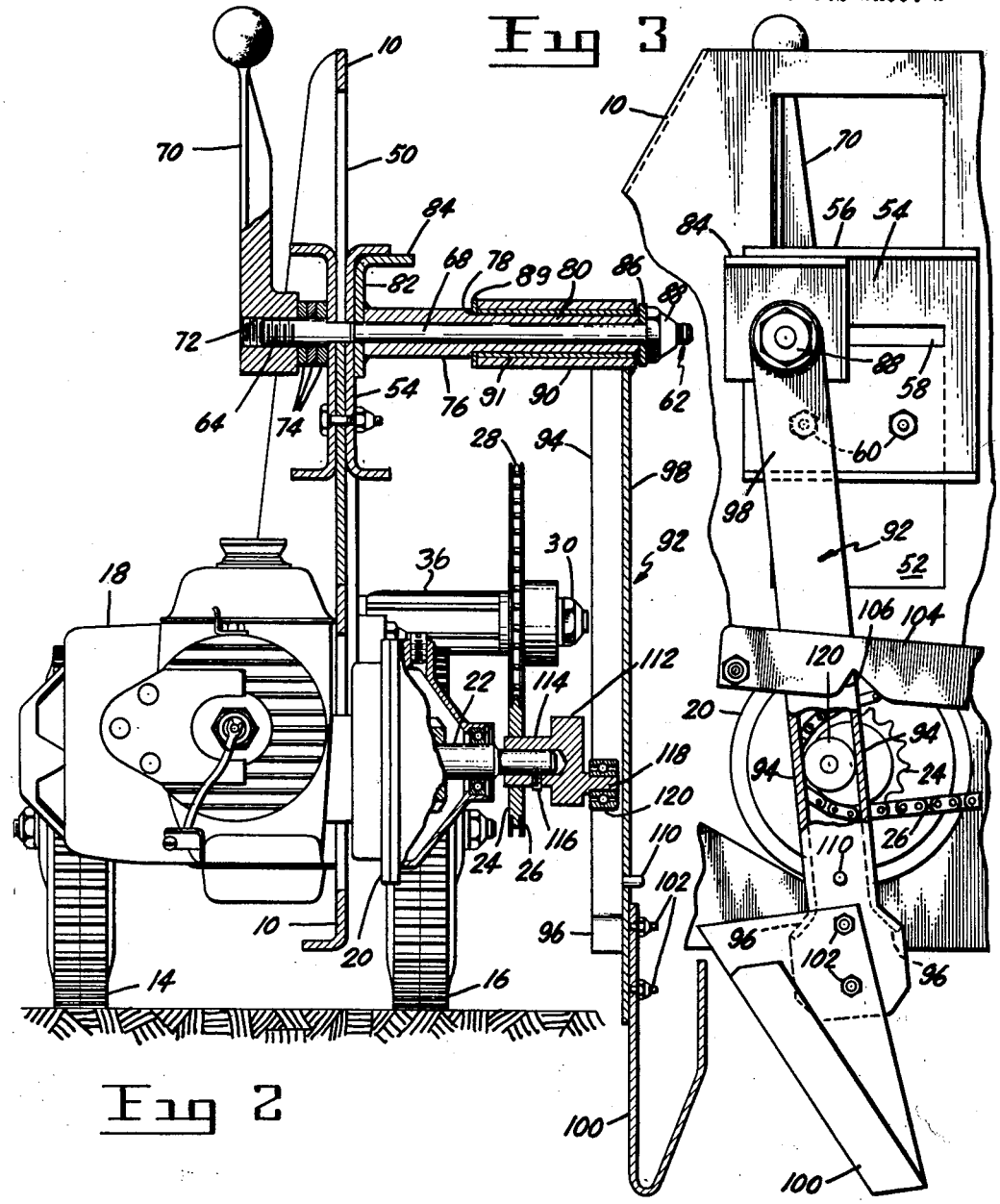
INVENTOR.
FRANCIS J. DITTER
BY
Stuart R. Peterson
ATTORNEY United States Patent Office 3,129,770
Patented Apr. 21, 1964

3,129,770
POWERED TURF EDGING MACHINE
Francis J. Ditter, Minneapolis, Minn., assignor to Federal Aircraft Works, Incorporated, a corporation of Minnesota
Filed Nov. 29, 1961, Ser. No. 155,559
9 Claims. (Cl. 172—15)

This invention relates generally to turf edging apparatus, and pertains more particularly to a powered machine employing an oscillatory blade action in effecting the edging operation.

One object of the invention is to provide a machine capable of neatly trimming golf course sand traps, walks, driveways, flower beds, and tree bases. In this regard, it is an aim of the invention to avoid having a ragged appearance imparted to the turf that has been trimmed. Stated somewhat differently, the present invention voids any overhanging grass or tendrils.

Another important object of the invention is to provide a simple and easy to operate locking mechanism for both depth and angle control of the cutting blade. Thus, if the turf is relatively thin, then the depth of cut can be adjusted for such a condition, a feature of the invention being that the machine can be tipped on its side in order to adjust the depth of cut; the weight distribution or balance of the machine in conjunction with the location of its wheel supports permits the machine to be readily tipped. Also, depending upon the type of soil, particularly whether hard or soft, the blade angle at which the trimming takes place can be controlled with the present invention.

Another object of the invention is to permit the edging blade to be raised completely out of the ground and at the same time effect a disengagement thereof from the driving motor so that the machine can be easily moved from location to location. For instance, it is planned that the machine will find especial utility on golf courses, and the machine of the instant type can be readily moved under its own power from place to place on the course as circumstances dictate.

Another object of the invention is to provide a turf edging machine that is usually self-propelled but which can be manually pushed so that closed control of the work may be accomplished.

A further object of the invention is to permit the facile changing of one type of blade for another. In this respect, it has been found that different blade configurations are highly desirable in producing the edging effect that presents the best overall appearance. More specifically, if one is edging a sidewalk he would prefer a different type of blade, generally speaking, from that which would be desired for trimming a golf course sand trap. The present invention makes the changing of blades quite easy.

Yet another object of the invention is to provide an edging machine that is quite simple, easy to operate, and which will require very little servicing.

A still further object of the invention is to provide good traction when operating a machine constructed in accordance with the teachings of my invention, it being planned that the propulsion be made through both rear wheels and that the rear wheels be located so that the major weight of the machine, together with the leverage that can be applied via the handle bars, aids in the achieving of the improved traction.

Other objects will be in part obvious and in part pointed out more in detail hereinafter.

The invention accordingly consists in the features of construction, combination of elements and arrangement of parts which will be exemplified in the construction hereafter set forth and the scope of the application which will be indicated in the appended claims.

In the drawaings:

FIGURE 1 is a perspective view of one form that my edging machine may assume, the cutting blade being depicted in a raised or elevated position;

FIGURE 2 is a view largely in section taken along the line 2—2 of FIGURE 1, the view differing from FIGURE 1 by reason of the fact that the blade is shown in a lowered or operable position;

FIGURE 3 is a fragmentary side elevational view illustrating the oscillatory arm in a forwardly adjusted position so as to impart a negative angle to the blade; and FIGURE 4 is a detail view in perspective of a mounting shaft playing an important role in permitting the blade to be properly adjusted.

Referring now in detail to the drawings, the machine exemplifying the present invention comprises an upstanding plate 10 equipped with a forward wheel 12 and a pair of rear wheels 14 and 16, at least the rear wheel 16 being fluted for a reason hereinafter explained. These wheels are keyed on a suitably journaled axle extending laterally from the lower portion of the plate 10. Secured to one side of the plate 10, as by suitable brackets (not visible), is a motor 18 of conventional design. Through the intermediary of a transmission 20, the motor 18 drives a shaft 22 (see FIGURE 2).

The shaft 22 in turn rotates a drive sprocket labeled 24 about which is entrained a chain 26. The chain 26 also extends about a driven sprocket 28. The driven sprocket 28 is carried on a sprocket shaft 30 finding support at one end on a triangular sprocket support plate denoted 32. As can be seen from FIGURE 1, the sprocket support plate 32 is mounted on a pivot pin 34 anchored to the upstanding plate 10. In addition to carrying the sprocket 28, the shaft 30 additionally supports a pinion 36 which is configured so as to mesh with various flutes on the wheel 16. Stated somewhat differently, it is the office of the pinion 36 to transmit driving power to the wheel 16 so as to propel or advance the machine across the turf to be trimmed.

A bias spring 38 acts in a direction to disengage the pinion 36 from the wheel 16. However, a clutch rod 40 extends between the triangular plate 32 and a crank arm 42 affixed to a pivot pin 44. The pivot pin 44 is journaled on a handle 46 extending upwardly and rearwardly from the lower rearward quarter of the plate 10. Through the medium of a clutch actuating lever 48 the rod 40 can be moved in a direction to effect driving engagement between the pinion 36 and the wheel 16 via the triangular plate 32.

It will be observed that a rectangular opening designated by the numeral 50 is located in the upstanding plate 10. Slidably disposed within the confines of the opening 50 is a smaller plate 52. The function of this plate 52 will soon become manifest. At this time, it will also be noted that a pair of additional plates 54, there being one on each side of the plate 10, overlie the marginal edges of the rectangular opening 50. These additional plates 54 are provided with upper and lower flanges 56 and each contains a horizontally directed slot 58. The lower edges of the slots 58 are even with the upper edge of the slidably disposed plate 52. For a purpose presently to be explained, the plates 54 are only loosely held in place with respect to the slidable plate 52. Accomplishing this objective are bolts and nuts denoted by the reference numeral 60.

As clearly shown in FIGURE 4, a shaft 62 has a threaded large end 64, intermediate flats 66 which are spaced apart a distance equal to the slots 58, and a generally cylindrical projecting end 68 threaded at its tip. From FIGURE 2 it can be seen that a tightening lever 70 having a tapped transverse bore 72 at its lower end is attached to the larger end 64 of the shaft 62. A plurality of washers 74 are disposed between the lever 70 and the left-hand plate 82 as viewed in FIGURE 2.

A tubular bearing support 76 is employed on the side of the upstanding plate 10 opposite that of the lever 70. This bearing support has a shoulder 78 and a cylindrical bearing surface 80. Confronting the right-hand plate 54 is a face plate 82 welded to the tubular bearing support 76, the plate 82 having an integral guide flange 84 that slidably engages the underside of the upper flange 56 on the right-hand plate 54. Encircling the free end of the shaft 62 is a washer 86. A nut 88 is threadedly received on this free end of the shaft 82 and serves to urge the washer 86 against the adjacent end of the cylindrical bearing surface 80. Thus, when the lever 70 is tightened it forces the washer 74 against the left-hand plate 54, and the face plate 82 against the right-hand plate 54. In this way, the shaft 62 can be retained at a selected elevation within the opening 50 as well as in a preferred fore and aft position with respect to the slots 58. The reason for desiring this two dimensional positioning of the shaft 62 will become more apparent when the actual edging action is discussed.

The cylinder bearing surface designated by the numeral 80 serves as a journal for a sleeve bearing 90 having a suitable liner 91 therein (FIGURE 2). It is important to understand that the sleeve bearing 90 has an axial length somewhat shorter than the space existing between a washer 89 adjacent the shoulder 78 and the washer 86 when the nut 88 is fully tightened. Thus, the sleeve bearing 90 and its liner 91 are free to rotate about the bearing surface 80.

Fixedly connected at its upper end, as by welding, to the sleeve bearing 90 is a downwardly extending channel-shaped arm 92. The arm 92 includes parallel sides 94 having outwardly flaring lower ends 96 and a web portion 98. The channel-shaped arm 92 is thus free to oscillate about the pivot point provided by the shaft 62.

Detachably mounted at the lower end of the arm 92 is a generally V-shaped blade 100. The blade is attached by means of a pair of bolt and nuts 102. The particular blade configuration that has been presented will produce a notch or groove in the turf that is edged. This type of blade is well suited for providing such a notch or groove along a sidewalk or the like, the notch or groove presenting a neat appearance and also serving to collect water from the walk so that it will drain down into the soil. However, it is contemplated that in certain instances only a vertical blade will be needed. On the other hand, particularly when edging flower beds, areas around tree bases or sand traps on golf courses, an L-shaped blade will be preferred so that a strip of turf bordering the soil or sand can be severed and thereafter discarded.

In the illustrated instance a limit strip 104 having a notch 106 at its lower edge is affixed to the upstanding plate 10 through the agency of a pair of support rods 108. The purpose of the strip 104 is to provide a structural guide for the oscillating arm 92 and also to limit the amount that the arm 92 can be raised, and therefore the arm 92 is equipped with a lug 110 that engages the notch 106 when the arm 92 has been raised a maximum amount.

At this time attention is directed to the employment of an eccentric disc 112 having an integral collar 114. This disc is held fast to the drive shaft 22 by means of a key or as shown a set screw 116. The disc 112 carries an offset crank pin 118 having a bearing assembly 120 mounted thereon. The bearing assembly 120 is received within the confines of the sides 94 of the channel-shaped arm 92. It is the purpose of the bearing assembly 120 to have its outer race bear against the sides 94 so as to impart the desired oscillatory motion to the arm 92 as the shaft 22 is rotated by the motor 18. For the purpose of drafting simplicity the sprocket 24 is shown welded to the collar 114. In this way, the shaft 22 provides power for propelling or advancing the entire machine over the turf to be trimmed or edged and at the same time provides the requisite power for producing the oscillatory trimming or edging action.

Having provided the foregoing information, the operation and use of my edging machine should be readily apparent. Assuming for the moment, though, that the parts are in the relative positions shown in FIGURE 1, the user of the machine would first back off the lever 70 so as to free the plates from their clamped relationship against the marginal edges of the opening 50 in the vertical plate 10. This permits the shaft 62 to be moved downwardly as well as forwardly or rearwardly as circumstances dictate. This can be done very easily while the machine is tilted partially on its side, that is, at an angle of about 40 degrees.

In FIGURE 2, the shaft 62 has been shown as moved downwardly from the position in which it appears in FIGURE 1. It will be recalled that the bolt and nuts 60 are relatively loose and offer no resistance to the movement of the shaft 62 to its optimum position. Also, as the shaft 62 is moved downwardly, it follows that the channel-shaped arm 92 is also moved downwardly, the lower ends 96 of the sides 94 of the arm 92 guiding the arm so that the sides 94 thereof straddle the bearing assembly 120 on the crank pin 118. When fully raised, though, the bearing assembly 120 will be beneath the lower ends 96 of the arm 92 and the machine is then free to be moved without causing any oscillation of the arm 92. Under these circumstances the lug 110 will engage the notch 106 to control the position of the raised arm 92.

With the motor 18 running and the parts in the position in which they appear in FIGURE 2, the arm 92 is oscillated to and fro. All that the user then needs to do is to move the clutch actuating lever 48 so as to cause engagement of the pinion 36 with the fluted wheel 16 and the machine is thus propelled in a forward direction, the blade 100 simultaneously performing its trimming or edging task.

It has already been stated that the shaft 62, which functions as a pivot point for the arm 92, can be moved up and down as well as forwardly and rearwardly. Turning for a moment to FIGURE 3, it will be observed that the shaft 62 has been positioned in its most forward relationship with respect to the slots 58. Such an orientation is most desirable when cutting through hard soil. This imparts a negative angle to the lower end of the blade 100 so that it digs into the ground more effectively than when the shaft 62 is located at the rear of the slots 58. When located rearwardly, the blade 100 assumes an attitude most favorable for cutting in soft and moist soil. Consequently, a machine constructed in accordance with the teachings of the present invention can be adjusted for various conditions that might be encountered, including both the depth of severance and also the angle at which such severance can best be accomplished. In addition, various blades may be quickly substituted, as hereinbefore pointed out, for the specific blade 100 that has been illustrated.

With respect to effecting a close control of the edging action, it will be observed that the operator need not use the motor 18 at all times for propelling the machine across the ground. In this regard, it will be noted that the operator only has to disengage the pinion 36 from its wheel 16 to stop the powered advancement of the machine. The operator can then manually push the machine at the best rate for the edging operation at hand, going extremely slow if circumstances so dictate. Of course, the blade 100 continues to oscillate during this period of close control, and desirably so, but by moving the machine itself quite slowly the operator can exercise the proper degree of control over the trimming.

As many changes could be made in the above construction and many apparently widely different embodiments of the invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

What is claimed:

1. A powered turf edging machine comprising an upstanding plate residing in a generally vertical plane, said plate having an opening therein providing spaced vertical edges, a plurality of supporting wheels attached to the lower end of said plate, a second plate slidably disposed within said opening, means for retaining said second plate at selected elevations with respect to said first plate, laterally projecting bearing means supported by said second plate, a downwardly extending arm pivotally carried by said bearing means, a turf edging blade element attached to the lower end of said arm so as to be movable therewith, a motor carried on said frame, and eccentric means driven by said motor for oscillating said arm in a vertical plane parallel to said first plate to effect a turf edging operation as said plate is advanced along the ground on said wheels.

2. A turf edging machine in accordance with claim 1 in which said plate retaining means includes a pair of additional plates attached to said second plate of a size to overlie the marginal edges of said opening, said plate retaining means further including means for clamping said additional plates against the sides of said first plate to hold said second plate at said selected elevations.

3. A turf edging machine in accordance with claim 2 in which said additional plates are formed with horizontal slots, a portion of said bearing means extending through said slots so that said bearing means can be moved forwardly and rearwardly to thereby shift the pivot point of said arm.

4. A turf edging machine in accordance with claim 3 in which the portion of said bearing means extending through said slots constitutes a shaft having a threaded end projecting from the side opposite said arm, and in which said clamping means includes a lever threadedly carried on said threaded shaft end, said clamping means also including a plate confronting said additional plate nearer said arm, whereby when said lever is rotated in one angular direction said last-mentioned plate is drawn against the additional plate it confronts to effect the clamping of said bearing means at a selected elevation and at a preferred position relative said horizontal slots.

5. A turf edging machine comprising a support constituting a vertical plate member adapted to be moved along the ground relative to the turf to be edged, an edging blade, means mounting said blade for forward and backward movement with respect to said support along one side thereof, a motor on said support at the other side thereof, means connecting said motor to said blade mounting means for causing said forward and backward movement of said blade, and clamping means engaging opposite sides of said support for fixedly adjusting said blade mounting means horizontally and vertically to vary the angle and depth of turf cut.

6. A turf edging machine in accordance with claim 5 in which said adjusting means includes a single handle at said one side of said support for effecting the clamping of said blade mounting means in a selected vertical and horizontal position.

7. A powered turf edging machine comprising a wheeled upright plate member, a downwardly extending channel-shaped arm pivotally and adjustably mounted adjacent the upper end of said plate member and to one side thereof, a turf edging blade element fixedly attached to the lower end of said arm, a motor carried on said plate member at the other side thereof, eccentric means driven by said motor and extending into the channel-shaped arm adjacent the lower end thereof for oscillating said arm forwardly and rearwardly to effect a turf edging operation as said wheeled plate member is advanced along the ground, and clamping means for raising and lowering the upper end of said arm to vary the depth of cut of said blade, said plate member having an opening therein and said clamping means engaging opposite sides of said plate member adjacent said opening.

8. A powered turf edging machine comprising a wheeled upright plate member, a downwardly extending channel-shaped arm pivotally and adjustably mounted adjacent the upper end of said plate member and to one side thereof, a turf edging blade element fixedly attached to the lower end of said arm, a motor carried on said plate member at the other side thereof, eccentric means driven by said motor and extending into the channel-shaped arm adjacent the lower end thereof for oscillating said arm forwardly and rearwardly to effect a turf edging operation as said wheeled plate member is advanced along the ground, and clamping means for adjusting the upper end of said arm in a fore and aft direction to vary the angle of cut of said blade, said plate member having an opening therein and said clamping means engaging opposite sides of said plate member adjacent said opening.

9. A powered turf edging machine comprising a wheeled upright plate member, a downwardly extending channel-shaped arm pivotally and adjustably mounted adjacent the upper end of said plate member and to one side thereof, a turf edging blade element fixedly attached to the lower end of said arm, a motor carried on said plate member at the other side thereof, eccentric means driven by said motor and extending into the channel-shaped arm adjacent the lower end thereof for oscillating said arm forwardly and rearwardly to effect a turf edging operation as said wheeled plate member is advanced along the ground, and clamping means for vertically and horizontally adjusting the upper end of said arm to vary both the depth of cut and the angle of cut, said plate member having an opening therein and said clamping means engaging opposite sides of said plate member adjacent said opening.

References Cited in the file of this patent

UNITED STATES PATENTS

| | | |
|---|---|---|
| 504,934 | Mueller et al. | Sept. 12, 1893 |
| 589,311 | Smith | Aug. 31, 1897 |
| 1,644,068 | McBride | Oct. 4, 1927 |
| 2,195,948 | Wentworth | Apr. 2, 1940 |
| 2,550,522 | Bolongaro | Apr. 24, 1951 |
| 2,664,807 | Hedrick | Jan. 5, 1954 |
| 2,682,824 | Bowser et al. | July 6, 1954 |
| 2,978,041 | Kramer | Apr. 4, 1961 |

FOREIGN PATENTS

| | | |
|---|---|---|
| 793,568 | Great Britain | Apr. 16, 1958 |